R. J. GATLING.
Rotary-Cultivator.
No 28,978.
Patented July 3, 1860.
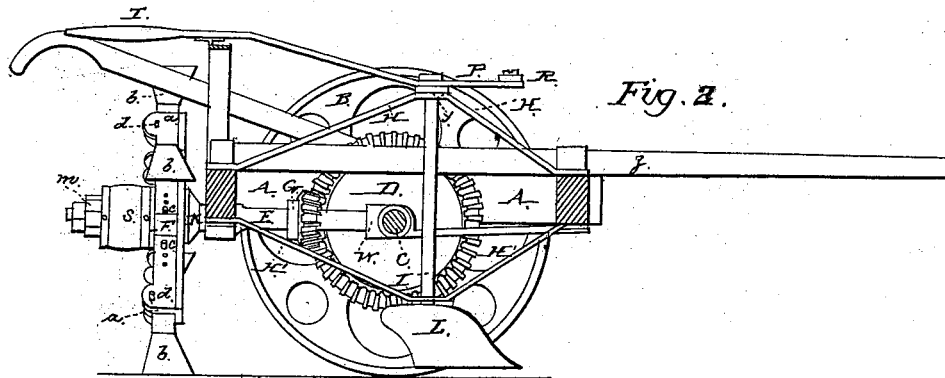
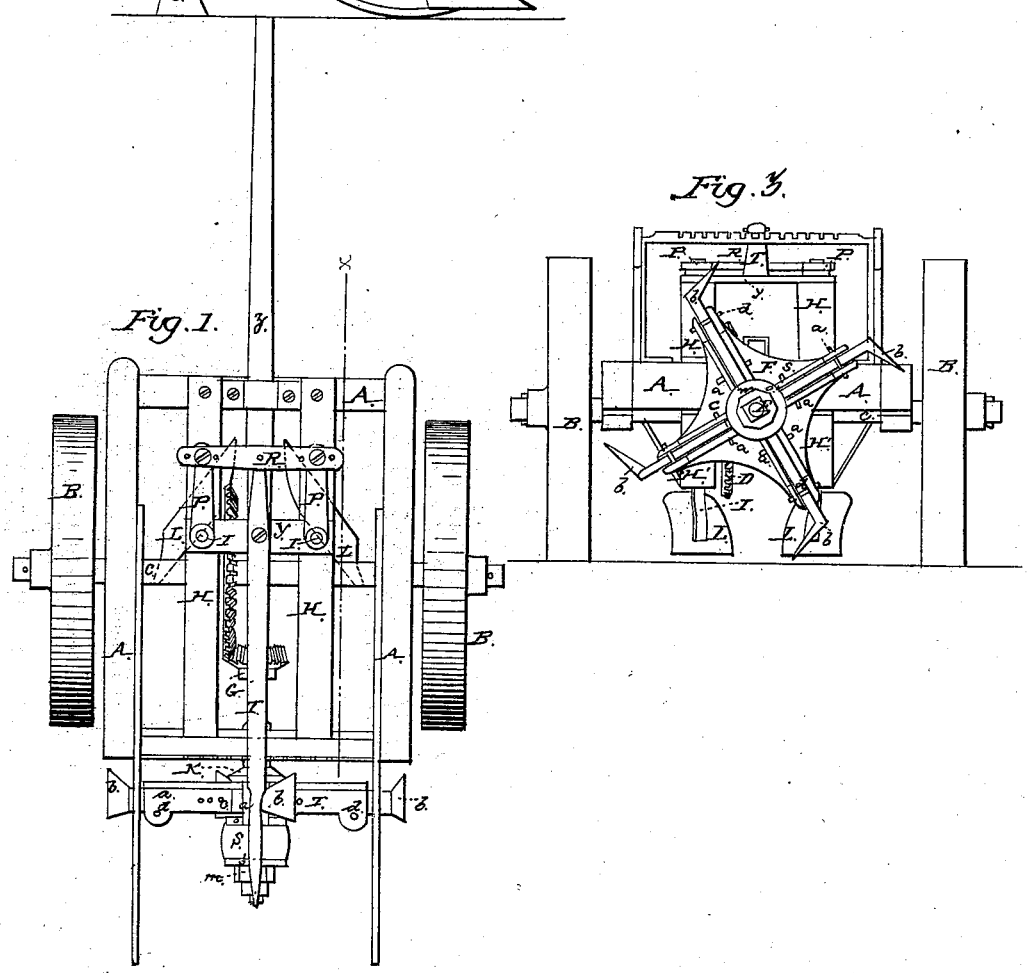

UNITED STATES PATENT OFFICE.

RICHARD J. GATLING, OF INDIANAPOLIS, INDIANA.

IMPROVEMENT IN COTTON-CULTIVATORS.

Specification forming part of Letters Patent No. 28,978, dated July 3, 1860.

*To all whom it may concern:*

Be it known that I, RICHARD J. GATLING, of Indianapolis, in the county of Marion and State of Indiana, have invented a new and Improved Machine for Thinning and Cultivating Cotton; and I do hereby declare that the following is a full, clear, and exact description of the same, reference being had to the annexed drawings, making part of this specification, in which—

Figure 1 is a plan or top view of my invention. Fig. 2 is a side sectional view taken in the line $x\ x$ of Fig. 1, and Fig. 3 is a rear end view.

Similar letters of reference indicate corresponding parts in the three figures.

The object of this invention is to obtain a simple and efficient machine for thinning and cultivating cotton during the early stages of its growth.

To enable those skilled in the art to fully understand and construct my invention, I will proceed to describe it.

The part lettered A represents a rectangular frame, to which the other parts of my invention are attached, and is supported by the wheels B B, one of which is firmly secured to the axle or shaft C. On shaft C the large beveled cog-wheel D is firmly keyed.

E is a horizontal shaft having one of its bearings in the middle of the rear cross-timber of the frame A and the other bearing in a box shown at W, Fig. 2. This shaft, being at right angles to shaft C, has a beveled pinion, G, keyed on it, so as to gear with the large cog-wheel D on shaft C.

The cutter-head F may be of cast-iron, of the form shown in the drawings, having the grooved arms $a$ for holding the stocks of the hoes or cutters $b$, which are secured therein by bolts $c$, that pass through holes in the arms and through the end of the cutter-stock near the center of the cutter-head, while the outer portion of the cutter-stock is held in its position by wooden pins $d$, that pass through holes in the arms near their outer ends and outside of the cutter-stock, as clearly shown in Fig. 3. This device for holding the hoes or cutters is for the purpose of providing against damage thereto in the event that they are drawn against some unyielding substance, as the wooden pin $d$ would thereby be broken, and the cutters turned out of the grooved arm on the bolt $c$ until the obstruction is passed, when the cutter can be turned back into its proper position and a new pin put in the place of the broken one.

There are several holes through the grooved arms at various distances from the center of the cutter-head, so that the cutters may be set or regulated to cut at any desired depth.

The cutter-head F is loosely fitted to shaft E, but is prevented from rotating on the shaft while doing its legitimate work of thinning the plants by a device which also serves to relieve the gearing and hoes or cutters from unusual strain or injury in the event that the hoes strike against any unyielding substance. The arrangement of this device is clearly shown in Figs. 1 and 2, where it is seen that the hub of the cutter-head F next toward the frame bears against a shoulder or collar, K, on shaft E, while against the opposite hub of the cutter-head is a loose washer, O, and against loose washer O an india-rubber spring, S, and against the india-rubber spring S another loose washer, O', and against the latter-named washer a female screw, M, working on a male screw cut on the end of shaft E. Now, it is obvious that if the female screw M is turned toward the cutter-head the india-rubber spring S will be compressed and the cutter-head bound by that compression with force that may be varied in degree at pleasure, and which, as before stated, will prevent it from turning on the shaft; but in the event that the hoes strike against some unyielding substance that would be liable to strain or injure the hoes or gearing the shaft can continue to rotate, while the cutter-head is prevented from so doing by the obstruction until it is passed, when the cutter-head will be again set in motion.

The plowshares or scrapers L are attached to the lower ends of the vertical rods I I, which are supported by the braces H H', as clearly shown in the drawings. These scrapers run one on each side of the row and operate to scrape the dirt, grass, &c., from the cotton-plants, thus performing the double work of scraping or cultivating both sides of the cotton-rows at the one operation.

The vertical rods I I have secured to their upper ends arms P P, which are connected at their outer ends by the connecting-bar R and the lever T, which has its fulcrum in the middle of the cross-bar Y, has one of its ends secured by a bolt to the middle of the connecting-bar R, while the handle of the lever extends back within convenient reach of the operator. The object of this arrangement is to provide a means by which the operator can vary the points of the scrapers by moving the lever to the right or left, so as to follow any curvature that may be in the rows of cotton without injury to the growing plants when the machine is at work. The connecting-bar R has several holes near each end to admit of the arms P being secured nearer to or farther from the middle of the bar, by which the points of the plowshares or scrapers may be adjusted to run as close to the row as may be desired.

Z is the tongue or draft-pole, to which the team is attached.

The operation of my invention is as follows: The plowshares or scrapers L scrape or cultivate each side of the rows of cotton as the machine moves along, the operator by means of the lever T varying the plows or scrapers at pleasure, either to the right or left, to follow any curvature that may be in the rows of plants. As the machine is drawn forward one of the wheels B, being made fast to the axle or shaft C, and which may be called the "driving-wheel," communicates through the cog-wheels D and G and shaft E a rotary motion to the cutter-head F, thereby causing the hoes or cutters thereto attached to cut or thin the plants from the rows of cotton, over which the machine is drawn at regular intervals, so as to leave the plants standing in a similar condition as if thinned by manual labor.

The spaces of plants cut or thinned from the rows may be varied to suit the views of the planter using the machine by increasing or diminishing the width or number of the hoes or by increasing or diminishing the size of either of the cog-wheels D and G.

Having thus fully described my invention, what I claim as new, and desire to secure by Letters Patent, is—

1. A rotary cutter-head provided with hoes or cutters capable of being adjusted to vary the depth of their cut, as well as to escape or pass over obstructions that may be in their path, substantially as herein shown and described.

2. The employment of two adjustable plowshares or scrapers capable of scraping or cultivating both sides of the rows of cotton or other plants by once passing over the ground, when arranged and constructed substantially as set forth.

RICHARD J. GATLING.

Witnesses:
J. HODGSON,
O. F. MAYHEW.